United States Patent [19]

Akiyama

[11] Patent Number: 4,477,838

[45] Date of Patent: Oct. 16, 1984

[54] TANGENTIAL ERROR SIGNAL GENERATOR IN PAL TYPE VIDEO DISC PLAYER

[75] Inventor: Toru Akiyama, Tokorozawa, Japan

[73] Assignee: Universal Pioneer Corporation, Tokyo, Japan

[21] Appl. No.: 331,880

[22] Filed: Dec. 17, 1981

[30] Foreign Application Priority Data

Dec. 18, 1980 [JP] Japan .................. 55-182298[U]

[51] Int. Cl.³ .............................................. H04N 9/44
[52] U.S. Cl. ................................................. 358/322
[58] Field of Search ....................... 358/320, 322, 323

[56] References Cited

U.S. PATENT DOCUMENTS

| | | | |
|---|---|---|---|
| 3,711,641 | 1/1973 | Palmer | 358/322 |
| 3,906,152 | 9/1975 | Hoogendijk | 358/323 |
| 3,967,311 | 6/1976 | Fuhrer | 358/322 |
| 4,109,277 | 8/1978 | Schylander . | |
| 4,236,173 | 11/1980 | Bierhoff et al. . | |

*Primary Examiner*—Richard Murray
*Attorney, Agent, or Firm*—Fleit, Jacobson, Cohn & Price

[57] ABSTRACT

A tangential error signal generator to be used in a PAL type video disc player in which a synchronous signal such as a pilot burst signal extracted from a color video signal read from a video disc of PAL type is compared with a reference periodic signal so as to produce a phase error signal representative of the phase difference between the synchronous signal and the reference periodic signal. The phase error signal is amended in accordance with the jump direction and the jump distance required for a desired mode of reproduction in the video disc player such as a still, fast or slow mode of reproduction.

6 Claims, 9 Drawing Figures

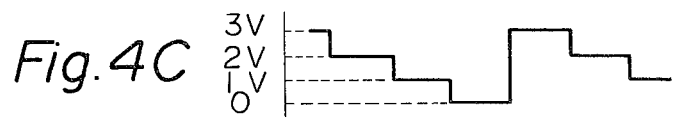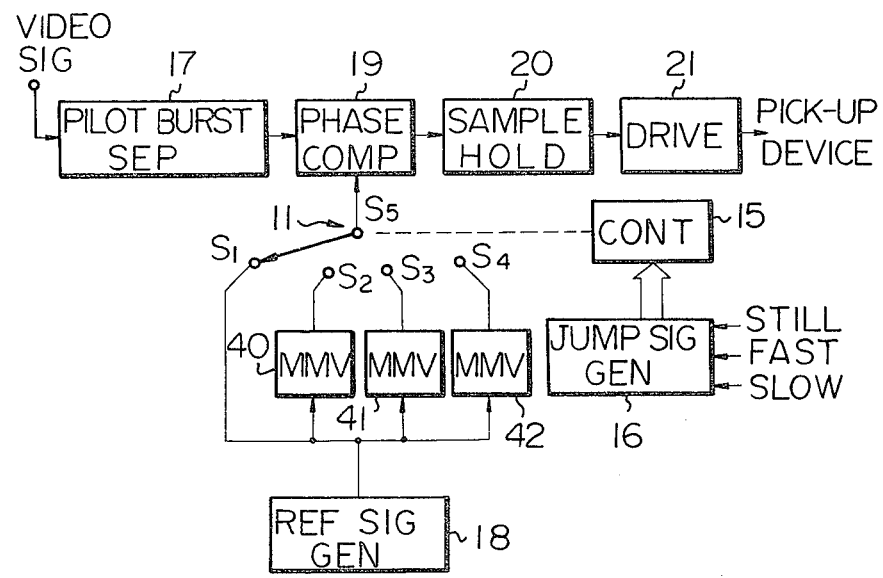

TANGENTIAL ERROR SIGNAL GENERATOR IN PAL TYPE VIDEO DISC PLAYER

FIELD OF THE INVENTION

The present invention relates in general to an information carrying disc player and in particular to a time axis regulating system in a color video information carrying disc player in PAL (Phase Alternation Line) system.

In recently developed "video disc" system, color video information is recorded on a so-called video disc optically, electrostatically, mechanically or otherwise in the form of a spiral track or a plurality of circumferential tracks. The video disc carrying thereon the color video information is mounted on a suitable drive means such as a turn-table and is rotated at a constant or a desired speed in the vicinity of a suitable pick-up device in a video disc player. The pick-up device produces a color video information signal representative of the recorded color video information. The color video information signal is usually modulated and carried on a suitable high frequency carrier. The color video information signal is demodulated and then processed to reproduce the original color video image on a suitable displayer such as a Brown tube.

It is well known in the art that the color video signal obtained from the video disc suffers fluctuations in its time axis due to eccentricity inherent to the video disc, fluctuations in the rotational speed of the turn-table, or the like. Thus, a tangential servo control system is provided in a video disc player for controlling the pick-up device to keep constant the tangential speed of the detecting point or spot on a target track on the video disc thereby to maintain constant the time axis of the obtained color video signal. The tangential servo control system is adapted to operate on the basis of phase difference between a reference periodic signal produced from an oscillator installed in the video disc player and a synchronous pulse signal seperated from the obtained color video signal, for example, a color burst signal contained in the video signal.

In the PAL system, a so-called "pilot burst" signal is inserted into the horizontal synchronous pulses upon recording of the color video signal on to the video disc. The pilot burst signal has a frequency integer-times as much as that of the horizontal synchronous pulse signal. The tangential servo control in the PAL video disc player is performed on the basis of phase difference between the pilot burst signal separated from the obtained color video signal and, for example, a reference horizontal synchronous pulse signal.

It is, on the other hand, well known in the art that the subcarrier frequency $f_{sc}$ and the frame frequency $f_F$ in the PAL system have the following relation:

$$f_{sc} = 177344.75 \times f_F \tag{1}$$

Thus, the corresponding two horizontal lined (H lines) of the successive two frames contains subcarrier signals different in phase by 90°. Namely, in a CAV (Constant Angular Velocity) type of video disc, two H line portions on the two neibouring tracks at the same angular position contains two subcarriers different in phase by 90°. When, accordingly, jump operations of the pick-up device beyond one or more pitches of tracks at some operations other than the normal reproduction, such as still, fast, slow, etc. cause a phase shift of 90°, 180°, or 270° in the subcarrier signals in the obtained color video signal, thereby to cause distortions in the color reproduction.

In order to avoid such distortions in the color reproduction in the PAL video disc player in the prior arts, there is provided a time-base shifter which applies a suitable time of delay to the color video signal obtained from the video disc. The time of delay is selected to be one of 90°, 180° and 270° in accordance with pithes of the jump of the detecting spot. When the jump pitch is one, then the delay time corresponds to 90°. When the jump pitch is two, then the delay time corresponds to 180°. When the jump pitch is three, then the delay time corresponds to 270°.

It has, however, been a problem that the prior art time base shifter includes at least three delay circuits for obtaining the above-mentioned delay time, which delay circuits are usually rather costly and complicated in constructions. Furthermore, it is required to adjust the levels of the output signals from the delay circuits so as to coincide the levels with each other.

It is therefore a primary object of the present invention to provide an improved time-base control system in PAL video disc player, which is dispensed with any delay circuit.

SUMMARY OF THE INVENTION

The above-mentioned object of the present invention can be accomplished by a tangential error signal generator in a time-base control servo, which includes: a separator for separating a time-base control synchronous signal from the demodulated color video signal; a reference signal generator for generating a reference periodic signal; a phase comparator for producing a phase error signal representative of a phase difference between said pilot burst signal and said reference periodic signal; a sample hold circuit for sampling said phase error signal at a sampling timing and for holding the sampled value during the sampling period so as to produce a tangential error signal to be used for time-base control; and amend means for amending said phase error signal in accordance with the jump direction and jump distance which are required for a mode of reproduction.

BRIEF DESCRIPTION OF THE DRAWINGS

The drawbacks inherent in the prior art video disc player and the features and advantages of a video disc player according to the present invention will be more clearly understood from the following description taken in conjunction with the accompanying drawings in which like reference numerals designate similar or corresponding components and in which:

FIG. 3A through 4C are diagrams respectively showing waveforms of signals appearing in the apparatus shown in FIG. 2; and FIG. 5 is a block diagram showing another tangential error signal generator according to the present invention.

DETAILED DESCRIPTION OF THE PRIOR ART

Figure 1:
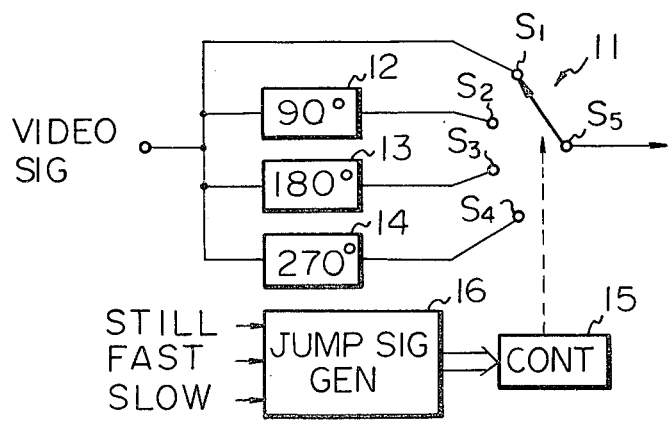
FIG. 1 is a block diagram showing a prior art tangential error signal generator.

As previously discussed briefly, a prior art time-base shifter generally shown in FIG. 1 receives a color video signal demodulated from a signal read from a video disc by means of a pick-up device. The video signal is delivered direct to a stationary contact $s_1$ of a change-over switch 11. The video signal is further delivered through delay circuits 12, 13 and 14 to stationary contacts $s_2$, $s_3$ and $s_4$, respectively. The change-over switch 11 relays one of the signals appearing at the contacts $s_1$ through $s_4$ under the control of a control circuit 15. The control circuit 15 actuates the change-over switch 15 in accordance with jump indication signals produced from a jump indication signal generator 16 and are representative of the jump direction and the jump distance or pitch. The jump indication signal generator 16 produces the jump indication signals in synchronism with the rotation of the video disc upon receipt of programmed or manual indications of still mode of reproduction, fast mode of reproduction, slow mode of reproduction, or the like. The pick-up device is controlled to shift its detecting point or spot from one track to another track apart from the one track by one or more pithes.

As already mentioned above, it has been a problem that the prior art time-base shifter includes at least three delay circuits which are rather costly and complicated in constructions and require the signal level adjustment of the output signals thereof.

DESCRIPTION OF PREFERRED EMBODIMENTS

Figure 2:
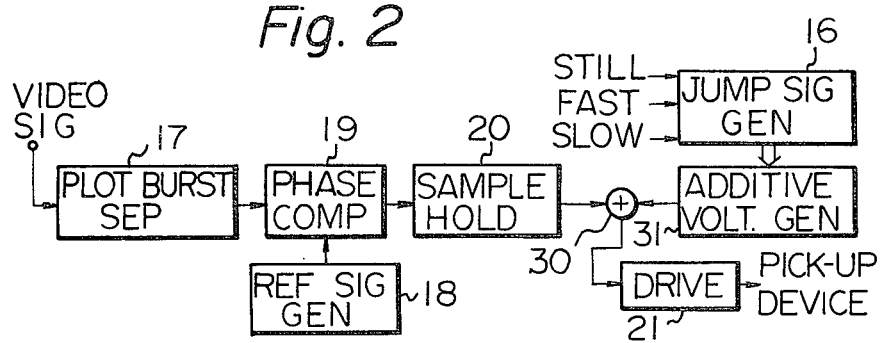
FIG. 2 is a block diagram showing a tangential error signal generator according to the present invention.

In order to solve the above-mentioned problem encountered in the prior art, a tangential error signal generator according to the present invention is dispensed with any delay circuit as shown in FIG. 2. The tangential error signal generator of FIG. 2 includes a pilot burst seperator 17 which extract a pilot burst signal from a color video signal demodulated from a signal obtained from a video disc through a pick-up device (not shown). The seperated pilot burst signal is applied to a phase comparator 19 which compares the pilot burst signal with a reference periodic signal from a reference periodic signal generator 18 and produces a phase error signal representative of a phase difference between the pilot burst and the reference periodic signal. The reference periodic signal may be a periodic signal having a frequency 1/N (N: integer) times as much as that of the pilot burst signal. The phase error signal is sampled at every sampling timing and held during the sampling period by a sample hold circuit 20. The sampled and held phase error signal is applied to one input of an adder 30 as a tangential error signal. To another input of the adder 30 is applied an additive voltage from an additive voltage generator 31. The additive voltage generator 31 produces the additive voltage having an intensity according to jump indication signals being representative of the jump direction and distance and supplied from a jump indication signal generator 16. The jump indication signal generator 16 is adpated to produce the jump indication signals in synchronism with the rotation of the video disc upon receipt of programmed or manual indications of still mode of reproduction, fast mode or reproduction, slow mode of reproduction or the like which require the jump operation. The sampled and held phase error signal is applied to a device driver 21 which actuates the device so that the detecting spot below the pick-up device and on the target track has a desired tangential speed whereby the phase of the pilot burst signal frequency of the obtained color video signal from the device is kept constant with respect to the phase of the reference periodic signal. In the case of an optically recorded disc player, the device driver 21 energizes tangential servo coil for actuating a tangential mirror or a pickup device which may include a laser diode. It is to be noted that an electronic controllable variable delay line such as CCD (Charge Coupled Device) may be driven by the device driver 21 in the same purpose.

The operation of the additive voltage generator 31 is explained with reference to FIGS. 3A through 4C.

Figure 3A:
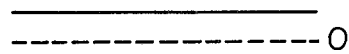
Figure 3B:
Figure 3C:
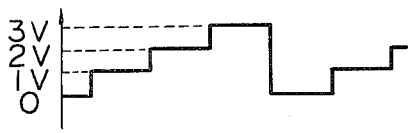

When the twice speed mode of reproduction which is one of the fast modes of reproduction is required, the jump indication signal generator 16 produces a jump direction signal having such a positive voltage as shown in FIG. 3A and a jump timing pulse signal having such a waveform as shown in FIG. 3B. The jump timing pulse signal is synchronized with the frame frequency $f_F$ corresponding to the rotational speed of the video disc. The additive voltage generator 31 receives the jump direction signal and the jump timing pulse signal and produces the additive voltage with such a voltage as shown in FIG. 3C. The additive voltage generator 31 may be comprised of an up-down counter which receives the jump direction signal at its up-down count mode select terminal and the jump timing pulse signal at its count input terminal, and a voltage generator for producing the additive voltage according to the count output from the up-down counter. In this case, the additive voltage repeats to increase stepwise in response to the jump timing pulse signal from 0 V through 1 V and 2 V to 3 V as shown in FIG. 3C. The additive voltage is superposed on the sampled and held phase error signal from the sample hold circuit 20 in the adder 30 and supplied to the driver 21. The driver 21 actuates the pick-up device so as to shift the time axis of the obtained video signal by 90°, 180° or 270° in accordance with the magnitude of the additive voltage 1 V, 2 V, or 3 V.

When still mode of reproduction is required, the jump indication signal generator 16 produces a jump direction signal having such a negative voltage and being representative reverse jump as shown in FIG. 4A. The jump indication signal generator 16 further produces a jump timing pulse signal having such a waveform as shown in FIG. 4B. The jump timing pulse signal is synchronized with the frame frequency $f_F$, that is, the rotational speed of the video disc. The additive voltage generator 31 produces an additive voltage having such a voltage stepwise varying as shown in FIG. 4C. In this case, the additive voltage repeats to change stepwise from 3 V through 2 V and 1 V to 0 V in synchronism with the jump timing pulse signal. The driver 21 thus actuates the pick-up device so that the time axis of the obtained color video signal changes from 360° through 270° and 180° to 90°.

FIG. 5 shows another tangential error signal generator according to the present invention which includes a pilot burst seperator for extracting a pilot burst signal from the obtained color video signal. A phase comparator 19 compares the pilot burst signal with a signal from a movable contact $s_5$ of the change-over switch 11. A reference periodic signal having a frequency 1/N (N: an integer) times as much as that of the pilot burst signal is produced from a reference signal generatcr 18. A technique related to this embodiment is disclosed in a British patent application No. 8115647 filed May 21, 1981 by the same Applicant. The reference periodic signal is applied direct to a stationary contact $s_1$ and through monostable multivibrators 40, 41 and 42 to stationary contacts $s_2$, $s_3$ and $s_4$. The monostable multivibrators 40, 41 and 42 respectively have quasi-stable periods respectively corresponding to delay times 90°, 180° and 270°. The change-over switch 11 selectively relays the reference periodic signal passed through the stationary contacts s₁, s₂, s₃ and s₄ under the control of a control circuit 15. The control circuit 15 cyclicly actuates the change-over switch 11 in response to jump direction and jump timing signals from a jump signal generator 16 so that the movable contact s₅ is connected with the stationary contacts s₁ through s₄ in sequence in synchronism with the jump timing pulse signal. When the change-over switch 11 is constituted by an lectronic devices, the controller 15 may produce such a voltage as to cyclicly changes from a lower voltage to a higher voltage and vice versa as shown in FIGS. 3C and 4C. The phase error signal from the phase comparator 19 is processed in a sample hold circuit 21, and a driver 21 in the same manner as the prior art apparatus shown in FIG. 1.

The tangential error signal generator shown in FIG. 5 is dispensed with any delay circuit but utilizes three monostable multivibrators 40, 41 and 42 which are relatively economical.

It is to be noted that the level and the change timing of the additive voltage produced from the additive voltage generator 31 may be determined in accordance with the distance or pitches of one jump operation and jump timing both of which vary according to the required mode of reproduction.

It will be understood that the invention is not to be limited to the exact construction shown and described and that various changes and modifications may be made without departing from the spirit and scope of the invention, as defined in the appended claims.

What is claimed is:

1. A video disc player in which a video disc of PAL type is rotated in the vicinity of a pick-up device which reads a modulated color video signal from a target track on said video disc by means of an information reading spot, which comprises:
    tracking servo means for controlling the position of said information reading spot with respect to said target track in accordance with a tracking error signal and a tangential error signal;
    jump control means for controlling jumping operation by applying a jump command signal to said tracking servo means thereby to cause said information reading spot to jump from one target track to a required track in order to change the reading sequence of said modulated color video signal;
    demodulating means for demodulating the read modulated color video signal;
    a separator for separating a time-base control synchronous signal from the demodulated color video signal;
    a reference signal generator for generating reference periodic signal;
    a phase comparator for producing a phase error signal representative of a phase difference between said time-base synchronous signal and said reference periodic signal;
    a sample hold circuit for sampling said phase error signal at a sampling timing and for holding the sampled value during the holding period so as to produce said tangential error signal; and
    a phase correction means for correcting the phase of the demodulated color video signal in accordance with a position of said required track with respect to the position of said information reading spot, wherein said phase correction means is adapted to shift the level of said tangential error signal in accordance with the position of said required track.

2. A video disc player as claimed in claim 1, in which said phase correction means is adapted to shift the level of the tangential error signal by an amount corresponding to a phase shift of 90°, 180°, or 270° of the demodulated color video signal.

3. A video disc player as claimed in claim 1 or 2, in which said phase correction means is adapted to superpose a voltage onto said tangential error signal.

4. A video disc player according to claim 1, in which said correction means includes:
    an additive voltage generator for producing an additive voltage according to the jump direction and jump pitch of the required jump operation; and
    an adder for adding said additive voltage to the sampled and held value of said phase error signal so as to produce said tangential error signal.

5. A video disc player according to claim 1, in which said correction means includes:
    a pulse generator for generating repetition pulses in synchronism with said reference periodic pulse signal, said repetition pulses having pulse width according to the jump direction and the jump distance which are required for a mode of reproduction.

6. A video disc player according to claim 5, in which said pulse generator includes:
    a plurality of monostable multivibrators having different quasi-stable time periods and being triggered by said reference periodic signal;
    a change-over switch for relaying one of the output signals from said monostable miltivibrators; and
    a control circuit for controlling said change-over switch in accordance with the jump direction and the jump distance required for a mode of reproduction.

* * * * *